(12) United States Patent
Tabak et al.

(10) Patent No.: US 11,481,759 B2
(45) Date of Patent: Oct. 25, 2022

(54) METHOD AND SYSTEM FOR IMPLEMENTING A VIRTUAL SMART CARD SERVICE

(71) Applicant: THALES DIS FRANCE SAS, Meudon (FR)

(72) Inventors: Danny Tabak, Gemenos (FR); Didier Hugo, Gemenos (FR); Anthony Der-Krikorian, Gemenos (FR); Boris Grosmark, Gemenos (FR); Alon Cohen, Gemenos (FR); Jonas Paert, Gemenos (FR)

(73) Assignee: THALES DIS FRANCE SAS, Meudon (FR)

( * ) Notice: Subject to any disclaimer, the term of this patent is extended or adjusted under 35 U.S.C. 154(b) by 0 days.

(21) Appl. No.: 17/057,325

(22) PCT Filed: May 16, 2019

(86) PCT No.: PCT/EP2019/062681
§ 371 (c)(1),
(2) Date: Nov. 20, 2020

(87) PCT Pub. No.: WO2019/224106
PCT Pub. Date: Nov. 28, 2019

(65) Prior Publication Data
US 2021/0192493 A1    Jun. 24, 2021

(30) Foreign Application Priority Data
May 24, 2018    (EP) .................................... 18305632

(51) Int. Cl.
*G06K 5/00*        (2006.01)
*G06Q 20/34*    (2012.01)
(Continued)

(52) U.S. Cl.
CPC ....... *G06Q 20/351* (2013.01); *G06Q 20/3567* (2013.01); *G06Q 20/3829* (2013.01); *H04L 9/0861* (2013.01); *H04L 2209/76* (2013.01)

(58) Field of Classification Search
CPC .. G06Q 20/20; G06Q 20/351; G06Q 20/3567; H04L 63/0853; H04L 63/0485
(Continued)

(56) References Cited

U.S. PATENT DOCUMENTS 8,346,678 B1 *   1/2013   Markarian   .........   G06Q 30/0601
                                                            705/346
8,639,625 B1 *   1/2014   Ginter   ....................   G06F 21/51
                                                            705/51
(Continued)

FOREIGN PATENT DOCUMENTS

WO      2018004784 A1      1/2018

OTHER PUBLICATIONS

International Search Report (PCT/ISA/210) dated Jun. 7, 2019, by the European Patent Office as the International Searching Authority for International Application No. PCT/EP2019/062681.
(Continued)

*Primary Examiner* — Daniel St. Cyr
(74) *Attorney, Agent, or Firm* — Marc Boillot—Thales DIS CPL USA, Inc

(57) ABSTRACT

A virtual smart card service corresponds to an execution of a smart card application. A key is stored at a server side. Application metadata is used to emulate a smart card application logic. The method comprises: processing, by a client, the smart card application logic; running the smart card application while retrieving smart card data from the smart card application logic; identifying key operation within the smart card application; generating a key operation request by using the identified key operation and data relating to the
(Continued)

client; sending to the server the key operation request; processing, by the server, the key operation request by using the key and client data; getting a key operation result from the identified key operation on the client data; and sending to the client the key operation result.

11 Claims, 1 Drawing Sheet

(51) Int. Cl.
  *G06Q 20/38* (2012.01)
  *H04L 9/08* (2006.01)

(58) Field of Classification Search
  USPC ................................. 235/380, 382, 487, 492
  See application file for complete search history.

(56) References Cited

U.S. PATENT DOCUMENTS

| | | | |
|---|---|---|---|
| 10,489,781 B1* | 11/2019 | Osborn | G06Q 20/38215 |
| 2013/0290717 A1 | 10/2013 | Hart et al. | |
| 2016/0012465 A1* | 1/2016 | Sharp | G06Q 20/386 |
| | | | 705/14.17 |
| 2016/0021117 A1 | 1/2016 | Harmon et al. | |
| 2016/0189127 A1* | 6/2016 | Amarnath | G06Q 20/322 |
| | | | 705/18 |
| 2018/0255591 A1* | 9/2018 | Valicherla | H04W 76/14 |
| 2019/0379683 A1* | 12/2019 | Overby | H04L 63/1408 |

OTHER PUBLICATIONS

Written Opinion (PCT/ISA/237) dated Jun. 7, 2019, by the European Patent Office as the International Searching Authority for International Application No. PCT/EP2019/062681.

* cited by examiner

METHOD AND SYSTEM FOR IMPLEMENTING A VIRTUAL SMART CARD SERVICE

FIELD OF THE INVENTION

The present invention relates generally to a method and a system for implementing a virtual smart card service.

The present invention is notably applicable to a field in which a client device includes e.g., a Personal Computer (or PC), a laptop, a tablet, a smart (tele)phone or any other computing device.

Within the present description, a virtual smart card service simulates a physical smart card behaviour(s), namely one or several cryptographic or key operations, such as a digital signature, encryption and/or decryption function(s)/operation(s).

STATE OF THE ART

It is known to use a Virtual Smart Card Server (or VSCS) that controls access to a plurality of virtual smart cards at a server side. The VSCS accesses a plurality of private keys stored in a secure data storage accessible only to the VSCS. The VSCS is remotely connected, through a network, like Internet, to a set of client computers, as Virtual Smart Card Clients (or VSCC). A VSCC requests the VSCS to perform a private key operation. The VSCS performs securely the private key operation. Then, the VSCS sends to the VSCC the result of the private key operation.

However, since the VSCC communicates with the VSCS by using Application Protocol Data Unit(s) (or APDU), for example, in an optimized version of a standard Gemalto VSCS product, the APDU level communication includes about twenty exchanged APDU messages for a Public Key Infrastructure (or PKI) type operation which represents an heavy network traffic and a low traffic performance.

US 2013290717 A1 and WO 2018004784 A1 describe both a solution in which a smart card application logic is emulated at a server side involving to exchange APDUs between a client side and the server side.

There is a need of an alternative solution that reduces a count of the required messages and therefore the associated network traffic and enhances the traffic performance.

SUMMARY OF THE INVENTION

The invention proposes a solution for satisfying the just herein above specified need by providing a method for implementing a virtual smart card service.

According to the invention, the virtual smart card service corresponds to an execution of a smart card application. At least one key is stored at a server side. The smart card application using application metadata to emulate a smart card application logic. The method comprises the following steps:

a) processing, by at least one client, the smart card application logic;

b) running, by the at least one client, the smart card application while retrieving smart card data from the smart card application logic;

c) identifying, by the at least one client, while running the smart card application, at least one key operation within the smart card application;

d) generating, by the at least one client, while running the smart card application, a key operation request by using the at least one identified key operation and data relating to the client;

e) sending, by the at least one client, through the smart card application, to the first server the generated key operation request;

f) processing, by the first or a second server, the generated key operation request by using the at least one key and the client data, the second server being connected to the first server;

g) getting, by the first or second server, a key operation result, the key operation result being the result of the at least one identified key operation on the client data; and h) sending, by the first or second server, through the smart card application, to the client the key operation result.

The principle of the invention consists in using, at a client side, application metadata to emulate a logic relating to a smart card application and one or several keys, only at a server side, in order to execute the smart card application. Once a client application uses the application metadata and gets smart card data from the smart card application logic, the client application finds, while executing the smart card application, one or several key operations to be carried out. Then, the client application builds a key operation request by using the key operation(s) and data relating to the client. The client application transmits, through the smart card application, to a first server the key operation request. Then, the first server or a second server connected hereto processes the key operation request by using a key(s) stored at the server side and the received client data. Once a corresponding key operation result is obtained at the server side, the first server transmits, through the smart card application, to the client application the key operation result.

Within the present description, application metadata is all of the data that allows emulating, at the client side, a smart card application logic apart from a (secret) key(s).

The claimed solution is based on a smart card application logic emulation at the client side. The smart card application logic emulation allows simulating a physical smart card behaviour at the client side.

When the client executes the smart card application, as a smart card application logic emulation, and finds an operation based on a secret key(s), the client builds or generates a corresponding key operation request and submits to the server side the key operation request. The (resulting) key operation request does not include any APDU.

Thus, the client offloads or delegates the key operation(s) to the server side that deals with or performs the concerned key operation(s).

The client side does only address the server side for a key operation(s).

Such an hybrid solution in which all of non-key operation (s) is carried out at a client side and all of key operation(s) is carried out at a server side allows exchanging few, typically only two, messages exchanged between the client side and the server side.

As a matter of fact, the client side exchanges with the server side a key operation request and a corresponding key operation result.

The invention solution allows getting an implementation of a virtual smart card service much simpler at the server side with respect to the aforementioned prior art virtual smart card service implementation at a monolithic server side.

The invention solution allows reducing a count of the exchanged messages between the client side and the server side and improving the traffic performance with respect to the aforementioned prior art solution.

The invention solution allows improving the traffic stability with respect to the aforementioned prior art solution.

The secret key(s), such as the private keys, is(are) not exposed outside of the server side since the secret key(s) is(are) stored and used at the server side.

According to an additional aspect, the invention is a system for implementing a virtual smart card service.

According to the invention, the system comprises at least one server and at least one client. The at least one server includes a first server. The virtual smart card service corresponds to an execution of a smart card application. The smart card application uses application metadata to emulate a smart card application logic. The at least one client is configured to:

process the smart card application logic;

run the smart card application while retrieving smart card data from the smart card application logic;

identify, while running the smart card application, at least one key operation within the smart card application;

generate, while running the smart card application, a key operation request by using the at least one identified key operation and data relating to the client;

send, through the smart card application, to the at least one server, the generated key operation request; and at least one key being stored at a server side, the at least one server is configured to:

receive, from the at least one client, the generated key operation request; and process the generated key operation request by using the at least one key and the client data;

get a key operation result, the key operation result being a result of the at least one identified key operation on the client data; and send, through the smart card application, to the client the key operation result.

BRIEF DESCRIPTION OF THE DRAWINGS

Additional features and advantages of the invention will be apparent from a detailed description of one preferred embodiment of the invention, given as an indicative and non-limitative example, in conjunction with the following drawings.

DETAILED DESCRIPTION

Herein under is considered an exemplary embodiment in which the invention method for implementing a virtual smart card service is implemented notably by a client application run by a PC, as a (computing) device and a standalone entity, i.e. without cooperating with another device, such as a hardware Secure Element (or SE), and two interacting remote servers, at a server side.

Within the present description, an SE is a component, as a smart object, that includes a chip(s) that protect(s), as a tamper resistant component(s), access to stored data and that is intended to communicate data with a device(s), like e.g., an SE host device and/or an SE user.

According to another exemplary embodiment (not represented), the invention method for implementing a virtual smart card service is implemented by a device in cooperation with a single local or remote server at the server side. According to such an embodiment, the server is adapted to perform the function(s)/operation(s) that is(are) carried out by the two servers as described herein below.

Naturally, the herein below described embodiment is only for exemplifying purposes and is not considered to reduce the scope of the present invention.

Figure 1:
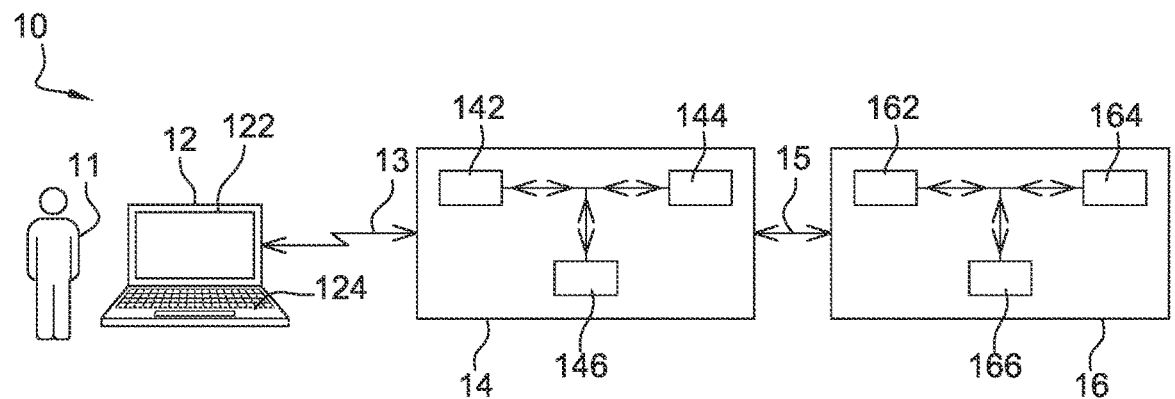
FIG. 1 illustrates a simplified diagram of an exemplary embodiment of a virtual smart card service implementing system comprising a client PC and two servers, the client side being configured to emulate a smart card application logic based on application metadata and send to the server side a request for performing one or several key operations, the server side being configured to perform the requested key operation(s), based on a secret key(s) stored at the server side and received client data, and send to the client side a result of the requested key operation(s), according to the invention.

FIG. 1 shows schematically a Virtual Smart Card (or VSC) service implementing system 10 and a user 11.

Such a VSC service implementing system 10 includes a PC 12, as a (computing) device, and two remote (web) ServeRs (or SR), a first SR (or SR1) 14 and a second SR (or SR2) 16.

The SR1 14 plays notably a role of interfacing with the client side.

The SR2 16, such as a Hardware Security Module (or HSM) type server, plays notably a role of key operator that offers a service of crypto (or key) operation(s).

The VSC service corresponds to an execution of a Smart Card Application (or SCA), such as an IDentity (or ID) Prime Mini Driver (or MD) Java Card (or JC) Applet.

The system 10 is preferably arranged to authenticate successfully (or not), a client, based on a predetermined associated authentication process at the client side, and access (or not) to a VSC application (or service) locally requested by the client (application) and comprising a key operation(s), such as e.g., a signature, an encryption and/or a decryption operation(s). The key operation(s) comprised within the requested VSC application use(s) one or several secret keys and is(are) only performed or carried out at the server side. The non-key operation(s) comprised within the requested VSC application is performed or carried out at the client side.

For the sake of simplicity, only one PC 12 has been represented at the client side.

However, the invention is applicable when the SR1 14 manages a set of clients (user(s) and/or application(s)) that may, each individually, use the PC 12 or a separate host device, at the client side.

The PC 12 includes one or several Central Processing Unit(s) (or CPU), (micro)processor(s) and/or (micro)controller(s) (not represented), as data processing means, one or several memories (not represented), as data storing means, and one or several Input/Output (or I/O) interfaces (not represented) that are internally connected to each other.

The (or each) PC processor processes data originating from and/or intended to any internal component and data originating from and/or intended to any external device through one or several PC I/O interfaces.

The PC memories may include one or several EEPROMs (acronym for "Electrically Erasable Programmable Read-Only Memory"), one or several ROMs (acronym for "Read Only Memory"), one or several Flash memories and/or any other memories of different types, like e.g., one or several RAMs (acronym for "Random Access Memory").

A PC memory (and/or a memory of another device connected or coupled to the PC 12) stores an Internet Protocol (or IP) address, as a PC 12 Identifier (or ID), and/or other data that allow(s) uniquely identifying the PC 12 to be addressed from outside.

The PC I/O interface(s) may comprise (and/or be connected to) a display screen 122 and a keyboard 124, as a PC Man Machine Interface (or MMI), so as to interact with the user 11.

The PC I/O interface(s) may include e.g., a camera(s) (not represented), so as to capture a video (or picture) signal(s) that is(are) included in a (local) environment or context that is present in front of the camera.

The PC I/O interface(s) may include (or be connected or coupled to) e.g., one or several sensors that allow, each individually, to capture one or several signals relating to the context of the user 11.

The PC I/O interface(s) may include e.g., an antenna (not represented), allowing to transmit data, through e.g., a wireless link 13, via one (communication) network(s), such as Intranet and/or Internet, to the SR1 14.

The channel using the link 13 may be secure or unsecure. The channel may be related to a HyperText Transfer Protocol (or HTTP) (registered trademark) type channel, an HTTP Secure (or HTTPS) type channel or any other data communication channel.

The SCA, such as a MD SC emulation module (like e.g., Mini Driver Library implemented in C (or MDLibC)), uses application metadata to emulate a logic relating to the SCA, i.e. to present an SC that is physically inserted in a (hardware) SC reader.

The Safenet Authentication Client (or SAC) PKI Middle Ware (or MW) interacts with the MD SC emulation module, as SCA, via a Personal Computer Smart Card (or PCSC) APDU channel.

The application metadata may have been previously downloaded from the server side as further explained infra or loaded from a hardware accessory, such as an SE (not represented) that is embedded in the PC 12, connected or coupled to the PC 12.

The PC 12 (an SE or an accessory embedded herein, connected or coupled hereto) stores, in a memory, the application metadata.

The application metadata includes all of the infrastructure and data, apart from one or several secret keys, belonging to the SCA logic.

The application metadata allows emulating the SCA logic at the client side.

The application metadata includes all of the components or entities relating to the SCA, except from one or several secret keys, that allows the SCA logic emulation at the client side.

The application metadata includes a file structure, one or several (local and/or remote) access policies, a security environment.

The application metadata includes reference user credentials, such as a reference user Personal Identification Number (or PIN) and/or reference user biometric data.

The application metadata includes all of SC states, such as notably a submitted user PIN value(s) and/or a count of failed submitted user PINs.

The application metadata may include an identifier relating to each secret key to be used by the key operation(s) at the server side.

The application metadata is accessible in plain text, i.e. interpretable, preferably only to the client side.

The PC 12, as an host device, supports one or several Operating Systems (or OS), one or several applications, as a client application(s), that are likely to emulate a logic relating to an SCA by using the application metadata.

The SCA logic emulation is implemented and reflected to the (host) OS, like e.g., Windows (registered Trademark), as a (hardware) SC inserted in a (hardware) SC reader.

Only the PC 12 (or the SE or an accessory) and more exactly the client application, such as Outlook (registered Trademark), at the client side is able to parse and handle or process the application metadata.

The client application processes the SCA logic.

The client application runs the SCA while retrieving smart card data from the SCA logic.

The SCA logic emulation at the client side handles or processes all of APDUs which relate to all of non-key operations relating to the SCA. Such non-key operation APDUs represent a great majority of concerned APDUs relating to the SCA.

When emulating the SCA logic, all of APDUs which relate to all of key operations are translated to a corresponding request(s) for performing a corresponding key operation (s) at the server side by identifying the SR1 14, as a target of each and every key operation request. The key operation APDUs represent a minority of concerned APDUs relating to the SCA. The key operation request(s) is(are) thus transmitted to the SR1 14, so as to perform the concerned key operation(s) only when the key operation(s) is(are) needed.

The SCA logic emulation at the client side may allow enforcing the user 11 to perform a login to the SCA logic emulation.

The SCA logic emulation at the client side allows identifying one or several key operations, such as a signature, decryption and/or encryption operation(s), that are included within the SCA.

The SCA logic emulation at the client side allows generating a request for performing one or several key operations by using the (identified) key operation(s) and data relating to the client application.

The SCA logic emulation at the client side allows sending to the SR1 14 the (generated) key operation request.

The key operation request may include an identifier(s) relating to each key to be used by the server side to perform the key operation(s).

The PC 12 interacts with the SR1 14 thus only when a key operation(s) is(are) needed and to be performed only at the server side.

The PC 12 and more exactly the client application, when emulating the SCA logic, is configured to receive, through the SCA, as a key operation request response, a result relating to the key operation(s) performed at the server side.

The system 10 is preferably arranged to authenticate successfully (or not), a client, based on a predetermined associated Key Access Policy (or KAP) at the server side.

The KAP includes one or several criteria/conditions to be satisfied to access a key(s) to be used to perform, at the server side, a key operation(s) requested remotely (or locally) requested by the client side.

The criteria/conditions may include one or several elements of a group comprising:

a previous successful user authentication; and a previous successful client authentication.

The criteria/conditions may change in content and/or number.

The criteria/conditions may change depending on a result of a risk assessment based a client context.

The KAP includes, for each client registered at the server side, one or several predefined requirements relating to an associated predefined authentication process(es) relating to the concerned client, namely relating to the user 11 and/or the client application, that the client has to undergo and pass, so as to be authenticated. Such an authentication provides the necessary condition(s) to be satisfied and which, when successful, allow(s) accessing a result relating to a key operation(s) requested by the client side according to the associated KAP.

The KAP may include, for each client registered at the server side, one or several predetermined reference client authentication data items, such as a reference user PIN, a reference user One Time Password (or OTP) and/or a reference user password, that has(have) been previously respectively registered for each client account (i.e. during an enrolment or registration phase).

The KAP is associated with the client or a set of clients managed by or for the SR1 14.

The KAP is stored within a memory that is internal or external to the SR1 14 while being accessible to the SR1 14. The KAP may be stored at a separate server, such as the SR2 16 or another server (not represented).

Each server, namely the SR1 14 and the SR2 16, as computing device, includes one or several CPUs, (micro) processor(s) and/or (micro)controller(s), as data processing means 142 and 162, one or several memories, as data storing means 144 and 164, and one or several I/O interfaces 146 and 166 respectively that are internally connected to each other.

The SR1 14 and/or the SR2 16 may be operated or managed by a Mobile Network Operator (or MNO), a Mobile Virtual Network Operator (or MVNO), a banking Operator, a wire communication network operator, a service Operator (or administrator) or on behalf of a service Operator, as a service provider.

The (or each) server processor processes data originating from and/or intended to any internal component and data originating from and/or intended to any external device through one or several PC I/O interfaces.

The server memories may include one or several EEPROMs, one or several ROMs, one or several Flash memories and/or any other memories of different types, like e.g., one or several RAMs.

The (or each) server memory(ies) stores preferably, besides an OS, a (server) invention application accessible from the SR1 14 or the SR2 16 processor(s).

A server memory stores an IP address, as an SR1 IDentifier (or ID), and/or other data that allow(s) uniquely identifying the SR1 14 and the SR2 16 to be addressed from outside.

The server I/O interface(s) may include an I/O interface allowing to exchange data, through e.g., a wire or wireless link 15, between the SR1 14 and the SR2 16. The SR1 14 is thus connected or coupled to the SR2 16.

The SR1 14 is remote and accessible through possibly one, two or more communication networks, such as an Intranet network and/or an Internet network, that allow to define or form a corresponding communication channel.

According to an alternative embodiment (not represented), the SR1 14 or a software component is local. For example, the SR1 14 is embedded within a device (not represented), such as an SE that is connected or coupled to the PC 12.

The SR1 14 manages a set of client (user and/or application) accounts.

Each client may be a user (human), a machine or any device, such as an Internet of Things (or IoT) type device.

The SR1 14 is preferably accessed through an associated Application Provider Interface (or API) or a Service Provider Interface (or SPI).

The SR1 14 (or the SR2 16) is preferably adapted to control access to a key operation(s) requested by a registered client.

The application metadata may be stored at the server side.

The application metadata may be stored in an encrypted manner at the server side.

The SR1 14 may be adapted to receive from the client (application) a request for getting application metadata.

The SR1 14 may be configured to fetch or retrieve from a database or a file the application metadata by possibly involving the SR2 16, so as to decrypt encrypted metadata.

Once the application metadata is retrieved in plain text, the SR1 14 sends to the client the application metadata.

A content of the application metadata is preferably not accessible to the server side, namely the SR1 14 and/or the SR2 16. The server side is thus not able to parse and handle or process the application metadata. The application metadata is e.g., an opaque blob or the like, i.e. not interpretable by the server side, for the SR1 14 and/or the SR2 16.

The SR1 14 may be adapted to send to the client (application) the application metadata, as a response to the (received) application metadata request.

The SR1 14 is configured to receive from the client side a request for performing a key operation(s), such as a signature, an encryption and/or a decryption operation(s).

The SR1 14 is preferably configured to delegate to the SR2 16 the processing of the key operation(s).

The SR2 16 is configured to process the key operation request by using a secret key(s) and data relating to the client.

The secret key(s), such as a private key(s) and/or a symmetric key(s), may be identified within the key operation request.

The secret key(s) has(have) been previously generated at the client side and/or at the server side, namely the SR1 14, the SR2 16 or a third server (not represented) connected or coupled to the SR1 14 or the SR2 16 and that is dedicated to generating the secret key(s).

The secret key(s) is(are) stored preferably securely at the server side, namely the SR1 14, the SR2 16 or a third server (not represented) connected or coupled to the SR1 14 or the SR2 16. The SR1 14 may be able to receive from the client side, preferably in an encrypted manner, the secret key(s) that may have been previously generated by the client side.

Only the SR1 14 or the SR2 16 is preferably able to access the secret key(s) preferably after having decrypted corresponding encrypted secret key(s). The secret key(s) may have been encrypted by using a wrapping key, such as a tenant key. The SR2 16 is preferably adapted to access the secret key(s) by using the wrapping key (or a corresponding key).

The data relating to the client is to be received from the concerned client (application).

Such a separation of the application metadata and the secret key(s) allows isolating access to the application metadata from access to the secret key(s).

The application metadata is preferably accessible only to the client side under a preferable SC (i.e. local access) policy, such as a user PIN (and/or user credentials) verification(s), while the secret key(s) is(are) preferably accessible only to the server side under a preferable remote access policy.

The separation of the application metadata and the secret key(s) allows having an hybrid server-client SC virtualization schema.

The separation of the application metadata and the secret key(s) allows reducing the (communication) network traffic to only a key operation(s) to be performed at the server side. Besides the key operation(s) to be performed at the server side, the application metadata may be updated by involving the server side from the client side preferably in an encrypted manner. But such an application metadata update with the server side is not frequent. The client side may update the application metadata, so as to create, change and/or delete the concerned application metadata and/or generate a new secret key(s) and/or change a PIN error counter (for a PIN verification failure or a PIN verification success after PIN verification failure).

The separation of the application metadata and the secret key(s) may allow to combine the VSC implementation with a context based access. Each and every key operation request may thus include a server access token, like e.g., an OpenID Connect (or OIDC) protocol or a Kerberos ticket, in a header of the key operation request. Whenever a private key is to be used, a local access agent, like e.g., an IDentity Provider agent, may request an access token to be included in the key operation request, so as to identify the user 11, determine corresponding access permissions and apply a corresponding appropriate access control(s) in accordance with the client context.

Figure 2:
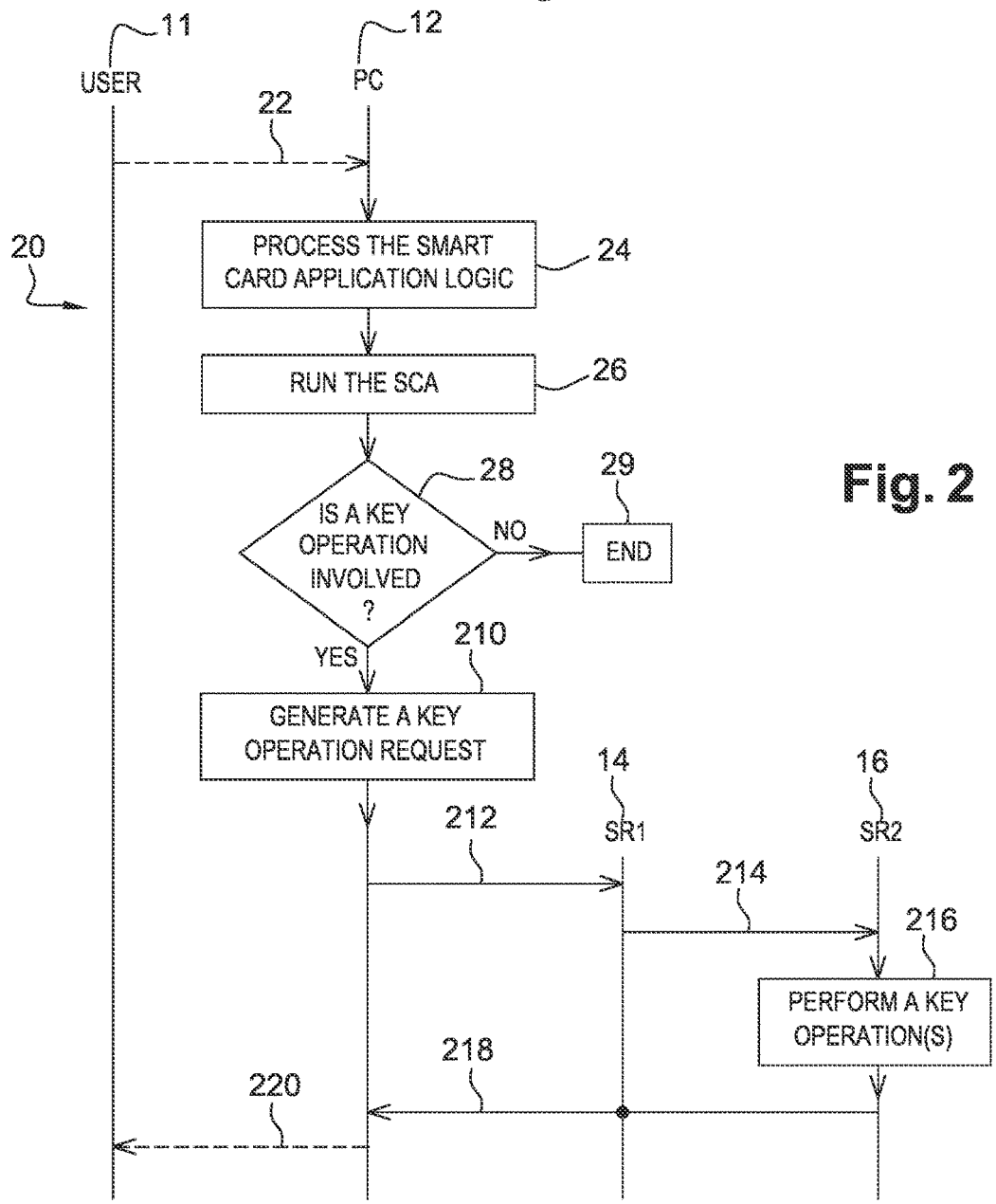
FIG. 2 represents an example of a flow of messages exchanged between the client side and the server side of the system of FIG. 1, so that the client side only exchanges with the server side for the requested key operation(s) based on the application metadata accessible to the client side and the secret key(s) only accessible to the server side.

FIG. 2 depicts an example of a message flow 20 that involves the user 11, the PC 12, the SR1 14 and the SR2 16 of FIG. 1, so as to implement a VSC application by emulating a SCA logic at the client side and performing a key operation(s) at the server side under request originating from the client side.

Optionally, the user 11 launches 22 the client application supported by the PC 12 while using an MMI that is included in or connected to the PC 12.

Alternately, an execution of the client application supported by the PC 12 is automatically launched (i.e. without any involvement of the user 11) (not represented).

Further to an initiative of the user 11, the PC 12 and more exactly the client application processes 24 the SCA logic.

The client (application) runs 26 the SCA by retrieving SC data from the SCA logic.

Then, the client (application), while running (not represented) the SCA, verifies (not represented) preferably whether submitted (and/or captured) user data, like e.g., a PIN (and/or biometric data), as the submitted user authentication data, does or does not match (and/or satisfy) the reference user 11 authentication data, like e.g., the reference user 11 PIN (and/or reference user biometric data), by e.g., comparing each submitted user authentication data item to a corresponding reference user authentication data item respectively, according to the access policy defined in the application metadata, as the condition(s) to be matched (and/or satisfied).

Once preferably the verification(s) of the condition(s) to be matched (and/or satisfied) has(have) been successfully performed, the client (application) analyses 28 whether the execution of the SCA, as an emulation of the SCA logic, does or does not include a key operation(s).

If the execution of the SCA does not include a key operation(s), then the client (application) terminates 29 the execution of the SCA.

Otherwise, i.e. if the client, while running the SCA, identifies a key operation(s), the client (application) generates 210, while running the SCA, a corresponding key operation request by using the (identified) key operation(s), such as an email decryption, and data, such as the email to be decrypted, relating to the client (application).

The (generated) key operation request includes an SR1 identifier and/or an SR2 identifier, so as to address the SR1 14 and/or the SR2 16 to perform the key operation(s) at the server side.

The (generated) key operation request may include one or several key identifiers, so that the SR2 16, as the key operator, identifies the secret key(s) to be used to perform the key operation(s).

The (generated) key operation request may include an access token and/or an OTP (or the like), so that the SR2 16, as the key operator, authorizes (or not) the client (application) and/or the user 11 access, when the access token is (or is not) the expected access token and/or when the OTP is (or is not) the expected OTP (respectively), to the secret key(s) to be used to perform the key operation(s).

The client (application) sends, while running the SCA, to the SR1 14 a corresponding (generated) key operation request 212.

The SR1 14 sends to the SR2 16 the (received) key operation request 214.

Preferably after a client (application) authentication using an access token (or the like) and/or a user authentication using an OTP (or the like), when applicable (i.e. when the client and/or the user is(are) successfully authenticated), the SR2 16 performs 216 the requested key operation(s), by using the concerned secret key(s) and the received client data, so as to process the key operation request.

To process the key operation request in a secure manner, the SR2 16 may previously decrypt the concerned encrypted secret key(s) by using the wrapping key (or a corresponding key).

Once the SR2 16 has got a corresponding key operation (processing) result, as a result of the key operation(s) performed on the client data, the SR2 16 sends, through the SR1 14, to the client 12 the key operation result, such as email data in plain text, i.e. unencrypted.

Optionally, the client application displays 220 (or lets another device display) the key operation result, so that the user 11 knows the key operation result.

The invention solution allows implementing a VSC service while emulating an SCA logic at the client side and performing a key operation(s) only at the server side.

The embodiment that has just been described is not intended to limit the scope of the concerned invention. Other embodiments may be given. As another embodiment, instead of using two separate servers, namely one and the same server implements the functions/operations performed by the two servers as described supra.

The invention claimed is:

1. A method for implementing a virtual smart card service, wherein, the virtual smart card service corresponds to an execution of a smart card application, at least one key being stored at a server side, the smart card application using application metadata for emulating a smart card application logic also thereby simulating a physical insertion of a smartcard, wherein the application metadata provides all data for said emulating, at a client side, said smart card application logic apart from a key, the method comprising the following steps:

a) processing, by at least one client on said client side, the smart card application logic using only said data from said application metadata;

b) running, by the at least one client, the smart card application while retrieving said application metadata for said emulating the smart card application logic without said key;
c) identifying, by the at least one client, while running the smart card application, a first server as a target for at least one key operation for using said key within the smart card application;
d) generating, by the at least one client, while running the smart card application, a key operation request by using at least one identified key operation for said target and application metadata relating to the client;
e) sending, by the at least one client, through the smart card application, to the first server the generated key operation request;
f) processing, by the first server, the generated key operation request for using the key and the application metadata, the second server being connected to the first server;
g) getting, by the first or second server, a key operation result, the key operation result being the result of the at least one identified key operation on the application metadata using said key; and
h) sending, by the first or second server, through the smart card application, to the client the key operation result.

2. Method according to claim 1, wherein, prior to emulating the smart card application logic, the method further comprises the following steps:
receiving, by the first server, from the at least one client, an application metadata request for getting the application metadata;
retrieving, by the first server, from a database or a file, the application metadata; and
sending, by the first server, to the at least one client the application metadata, as a response to the application metadata request.

3. Method according to claim 2, wherein, the application metadata is stored in an encrypted manner and, prior to sending the application metadata, the first or second server decrypts the encrypted application metadata.

4. Method according to claim 1, wherein only the first or second server accesses the at least one key while a content of the application metadata is not accessible to the first or second server.

5. Method according to claim 4, wherein, prior to using the at least one key at the server side, the first, second or a third server generates the at least one key, the third server being connected to the first server.

6. Method according to claim 1, wherein the step d) of generating, by the at least one client, while running the smart card application, a key operation request comprises translating at least one APDU relating to the at least one key operation to a corresponding key operation request.

7. Method according to claim 1, wherein, prior to using the at least one key at the server side, the client generates the at least one key and sends to the server side the at least one key.

8. Method according to claim 1, wherein, a key access policy being predetermined at the server side, the key access policy including at least one criteria to be satisfied to access the at least one key, the at least one criteria includes at least one element of a group comprising:
a previous successful user authentication;
a previous successful client authentication.

9. Method according to claim 8, wherein the at least one criteria changes depending on a result of a risk assessment based on a client context.

10. The method of claim 1, further comprising;
identifying a target for each and every key operation request;
translating all ADPUS for key operation requests to said target identified, whereby non-key operation ADPUs generated represent a minority of concerned ADPUs and
processing all ADPUS for non-key operation requests from said application data, whereby non-key operation ADPUs generated represent a majority of concerned ADPUs, and then
sending non-key operation ADPUs and key operation ADPUs to said first server so as to perform the concerned key operation(s) only when a key operation is needed, thereby
reducing a count to only two exchanged messages between said client side and said server side to improve traffic performance.

11. A system for implementing a virtual smart card service,
wherein, the system comprising at least one server and at least one client, the at least one server including a first server, the virtual smart card service corresponding to an execution of a smart card application, the smart card application using application metadata for emulating a smart card application logic also thereby simulating a physical insertion of a smartcard, wherein application metadata provides all of data for said emulating, at a client side, said smart card application logic apart from a key,
wherein the at least one client is configured to:
process the smart card application logic using only data from said application metadata;
run the smart card application while retrieving said application metadata from the smart card application logic;
identify, while running the smart card application, a first server as a target for at least one key operation for using said key within the smart card application;
generate, while running the smart card application, a key operation request by using at least one identified key operation for said target and application metadata relating to the client;
send, through the smart card application, to the at least one server, the generated key operation request; and
wherein, at least one key being stored at a server side, the at least one server on said server side is configured to:
receive, from the at least one client, the generated key operation request; and
process the generated key operation request by using said key on the application metadata;
get a key operation result, the key operation result being a result of the at least one identified key operation on the application metadata; and
send, through the smart card application, to the client the key operation result.

* * * * *